Dec. 20, 1932. S. E. BUETTELL 1,891,795
VEHICLE STORAGE SYSTEM
Filed April 23, 1928 12 Sheets-Sheet 2

Witness:
William P. Kilroy

Inventor
Samuel E. Buettell
By John E. Gardner
Atty.

Dec. 20, 1932.  S. E. BUETTELL  1,891,795
VEHICLE STORAGE SYSTEM
Filed April 23, 1928  12 Sheets-Sheet 4

Witness:
William P. Kilroy

Inventor:
Samuel E. Buettell
John E. Gardner
Atty

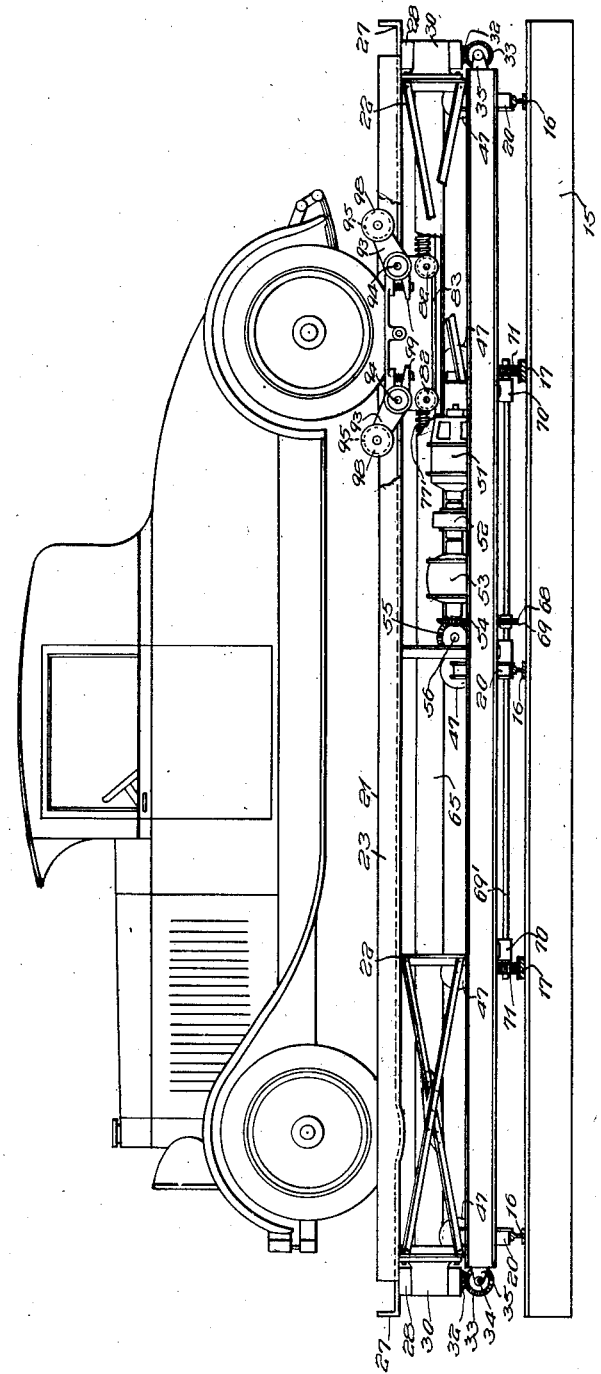

Dec. 20, 1932.   S. E. BUETTELL   1,891,795
VEHICLE STORAGE SYSTEM
Filed April 23, 1928   12 Sheets-Sheet 6
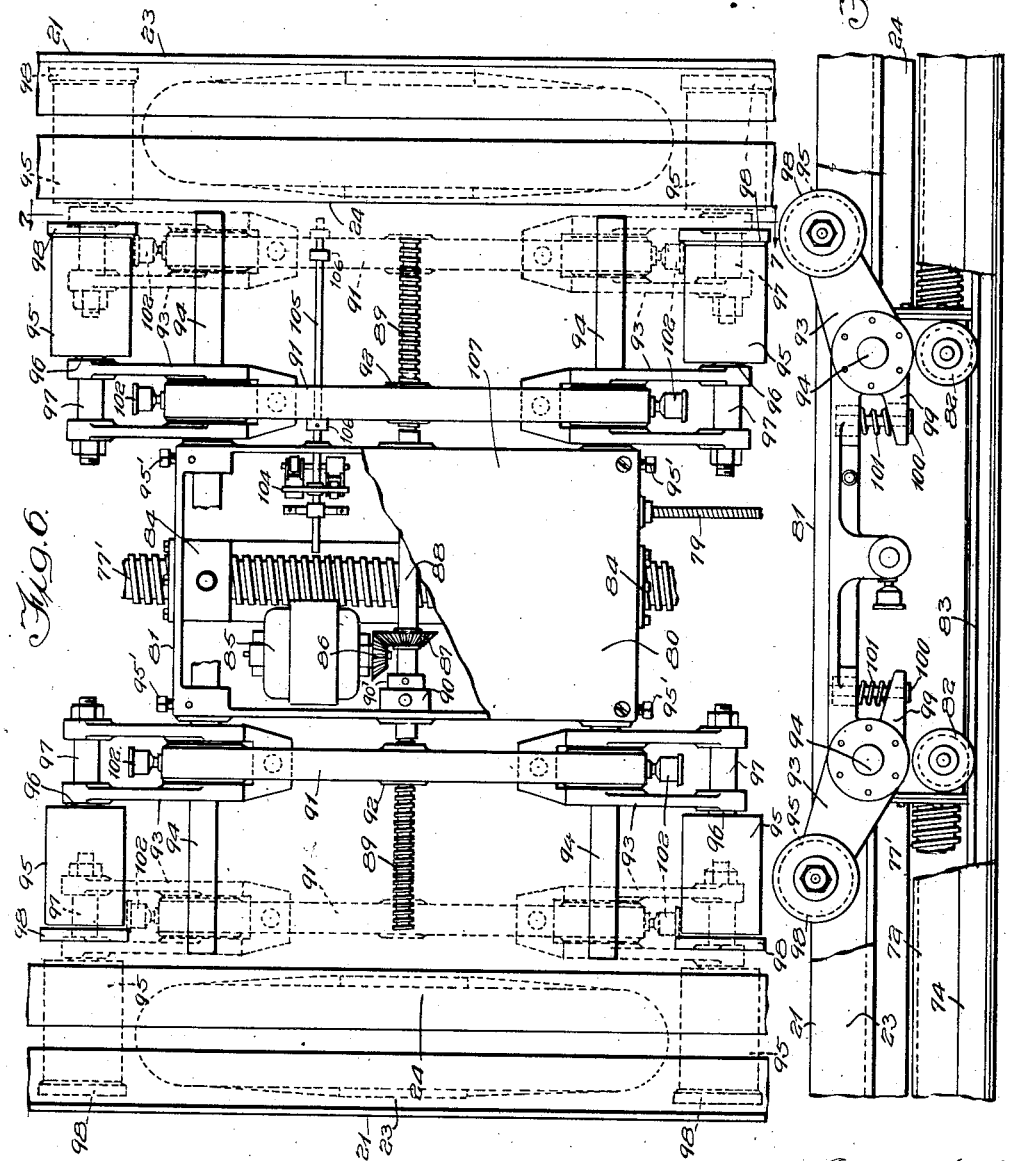
Witness:
William P. Kilroy
Inventor:
Samuel E. Buettell
By John E. Gardner
Atty

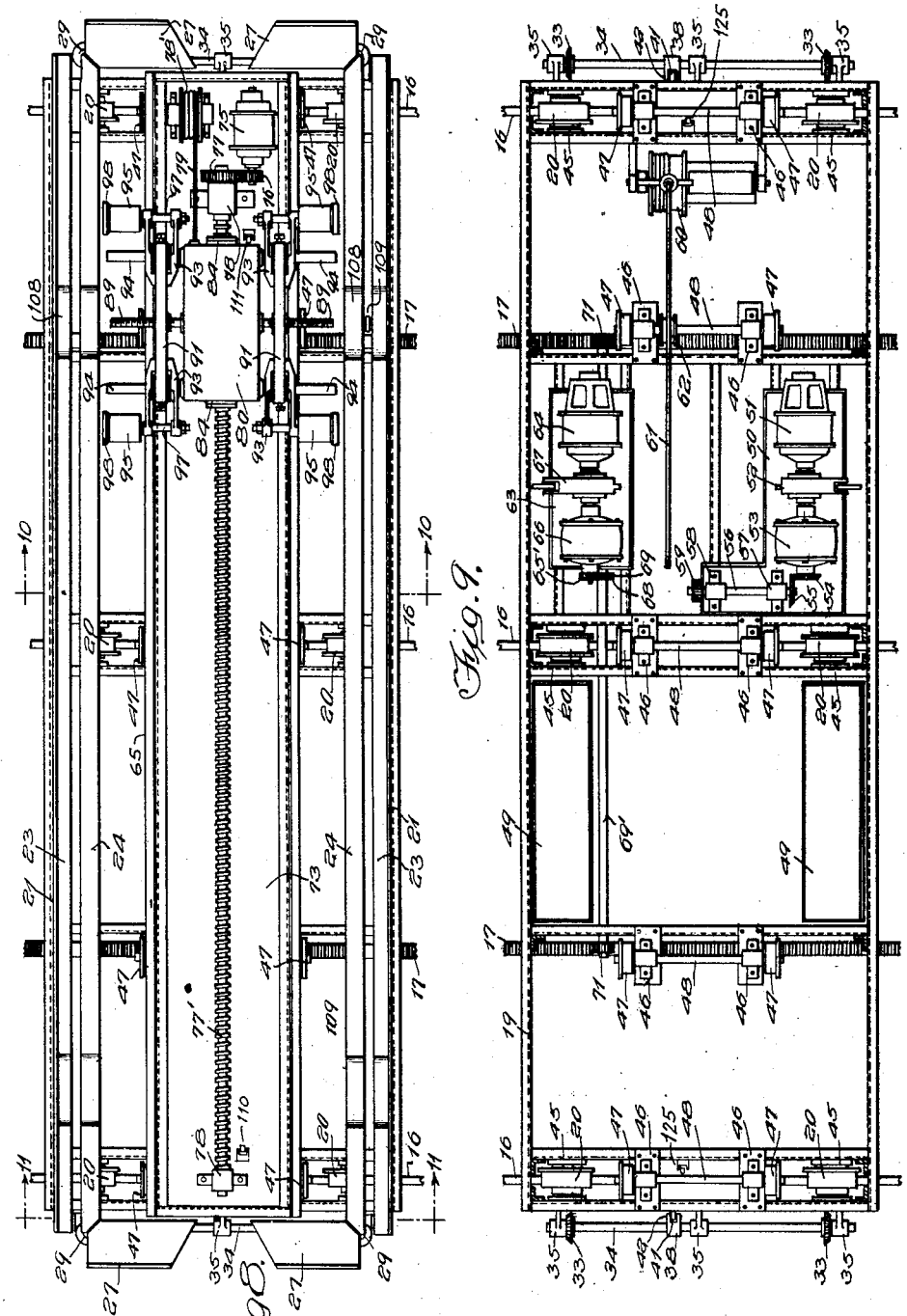

Dec. 20, 1932.  S. E. BUETTELL  1,891,795
VEHICLE STORAGE SYSTEM
Filed April 23, 1928   12 Sheets-Sheet 8
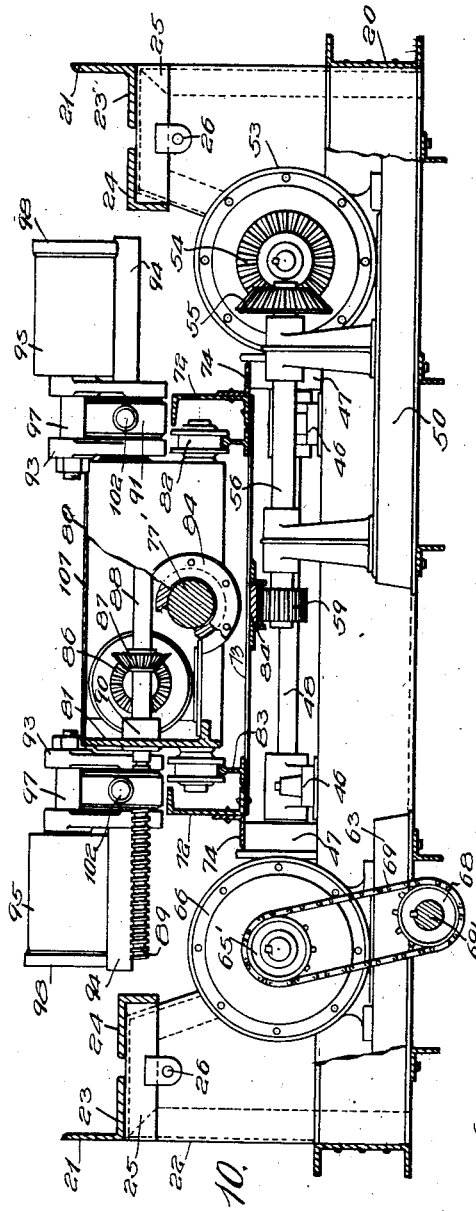
Witness:
William P. Kilroy
Inventor:
Samuel E. Buettell
John E. Gardner
By  Atty

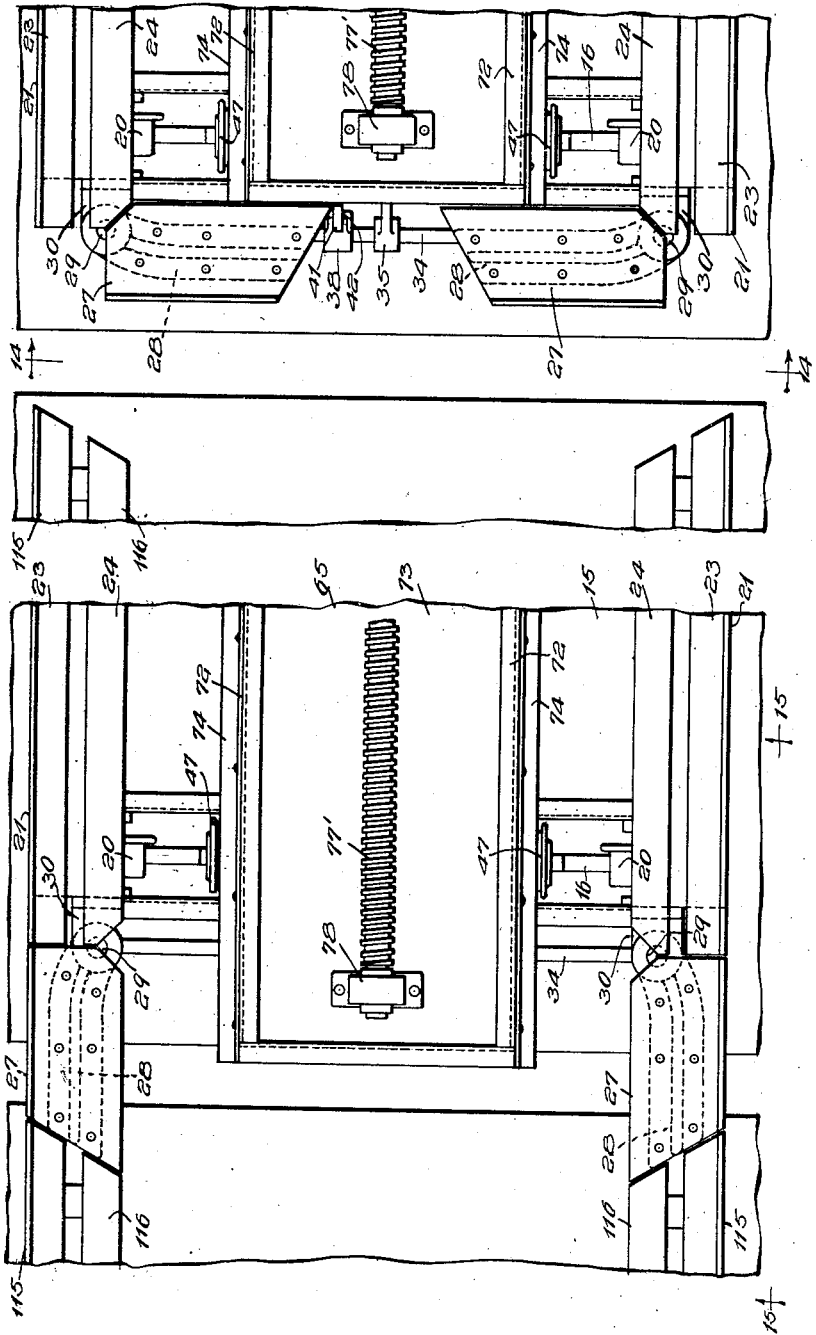

Dec. 20, 1932.  S. E. BUETTELL  1,891,795
VEHICLE STORAGE SYSTEM
Filed April 23, 1928   12 Sheets-Sheet 10
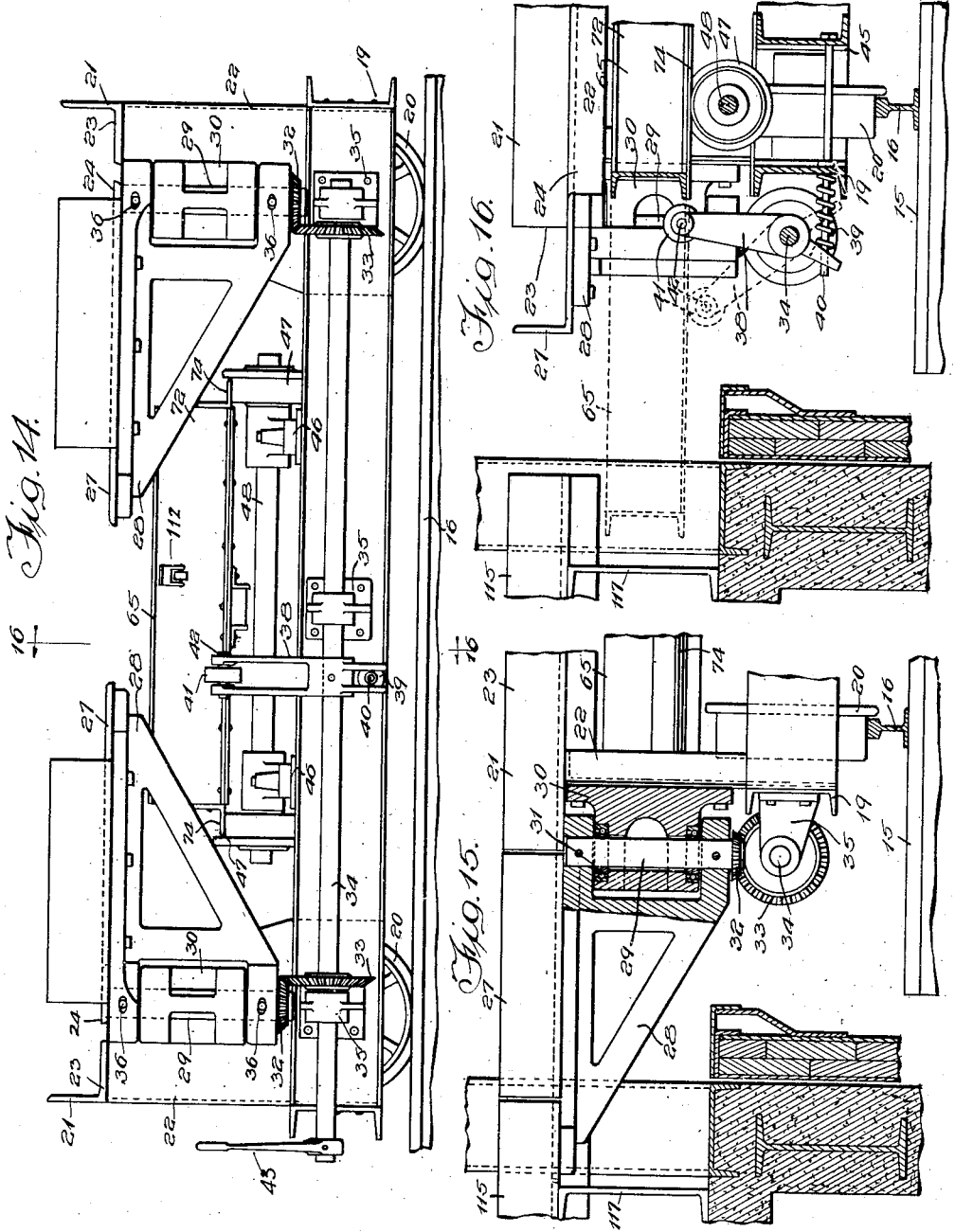
Witness:
William P. Kilroy
Inventor:
Samuel E. Buettell
By John E. Gardner
Atty Dec. 20, 1932.   S. E. BUETTELL   1,891,795
VEHICLE STORAGE SYSTEM
Filed April 23, 1928   12 Sheets-Sheet 11
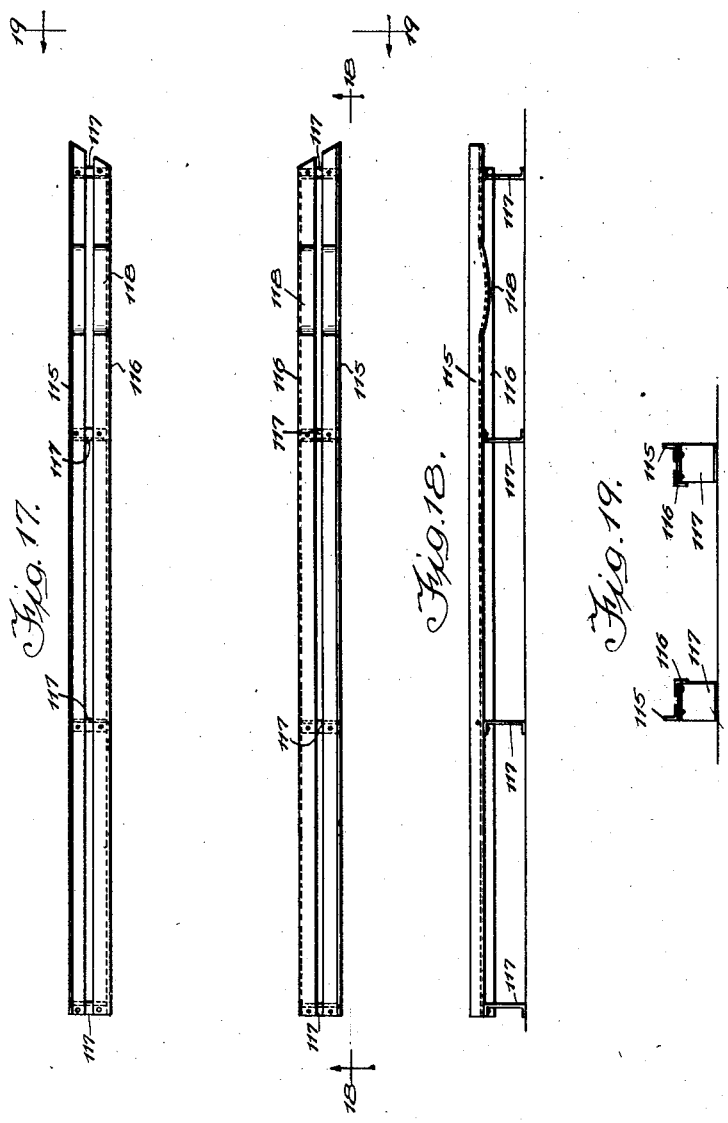
Witness:
William R. Kilroy
Inventor
Samuel E. Buettell
By John E. Gardner.
Atty

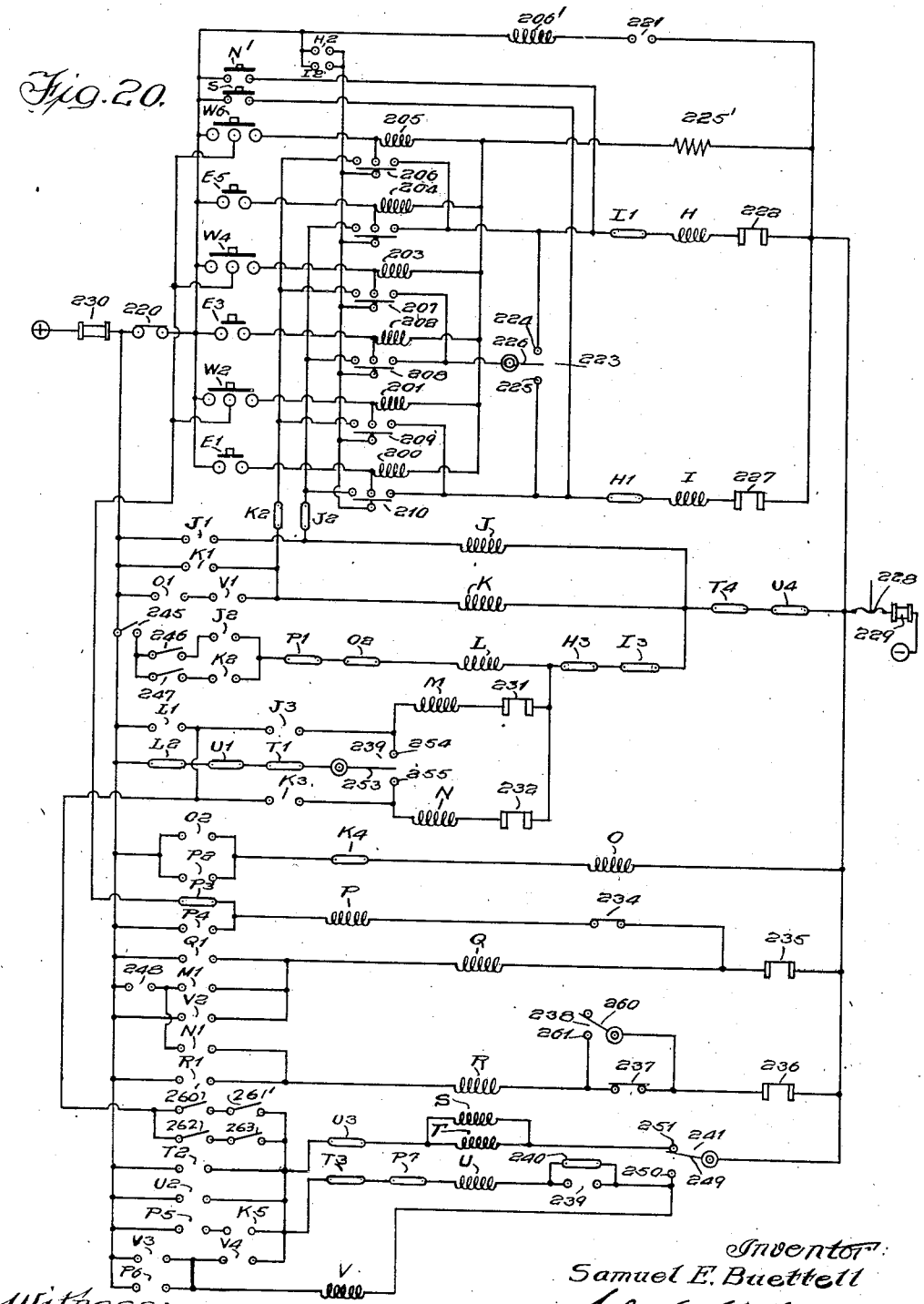

Patented Dec. 20, 1932

1,891,795

UNITED STATES PATENT OFFICE

SAMUEL E. BUETTELL, OF CHICAGO, ILLINOIS, ASSIGNOR TO CROSS PARKING SYSTEMS, INC., OF CHICAGO, ILLINOIS, A CORPORATION OF ILLINOIS

VEHICLE STORAGE SYSTEM

Application filed April 23, 1928. Serial No. 272,169.

The present invention relates in general to automatic vehicle storage systems for use in so-called automatic garages where vehicles are stored in a restricted space by automatic or semi-automatic machinery.

As is well known the problem of storing automobiles in congested districts or any other place where property values are high and the available space is restricted is momentarily becoming of increasing importance. Under the conditions mentioned it is necessary that automobiles be stored in a restricted space at a reasonable rental in order to induce patronage. The restriction as to space and the large property value make it necessary that the garage construction should be very cheap and automatic machinery must be employed in order to permit as large a number of cars as possible to be stored in a given space. The automatic machinery for controlling the storing of these cars must necessarily be strong and rugged in construction as well as being relatively cheap in order to meet the above specified conditions. The use of automatic machinery also eliminates high labor cost necessarily involved in other types of garages.

Automatic or semi-automatic machinery for this purpose has been proposed before, though, so far as I am aware, the apparatus for controlling the storing of the cars was relatively complex and not altogether foolproof.

One of the objects of my invention is to provide automatic machinery for handling the storing of cars in as centralized a unit as possible in order to make this automatic machinery able to handle a plurality of cars.

Another object is to associate automatic machinery of this character with the elevator that is used to raise the cars from floor to floor in a multi-story garage so that this mechanism may be used on any one of the floors.

Another object is to cause this automatic machinery to function to position the car in such manner as to be ready to enter an idle stall when the elevator stops at the floor at which this stall is located.

Another object is to make an elevator capable of transporting cars to a plurality of stalls accessible to that elevator only on every floor, or take cars from storage on those floors.

Another object is to so arrange the mechanical devices which bring about the handling of the car that they will all operate at high speed with a maximum safety factor.

Another object is to provide mechanism on the elevator which will handle cars to a plurality of stalls located on the opposite sides of the elevator hatchway on any floor.

A further object is to provide power devices for positively bringing about the movement of vehicles into the desired position instead of depending upon gravity or the like.

A further object is to provide means for protecting the vehicles when stored so that they cannot be moved from their respective storing stalls improperly.

A further object is to provide a simplified form of control system for operating mechanism that handles the cars.

A still further object is to provide protective devices that will function to prevent any car being damaged through a mistake of the operator.

There are other objects of my invention which together with the foregoing will be described in the detailed specification which is to follow, taken in conjunction with the accompanying drawings.

In practicing my invention, I prefer to provide a relatively large elevator that is capable of serving a plurality of cars in some instances. When a 3 position elevator is employed, the operating mechanism mounted upon it is capable of serving six stalls on every floor of the building. I have found that in congested areas the cars must be stored at high speed in order to take care of the traffic conditions. The speed at which a car must be stored may be determined by a study of the traffic conditions during the peak load periods. In residential areas this high speed of operation of the garage equipment is not essential, since cars do not arrive at the garage for storage, nor are they taken from them with such small intervals of time separating the demands. By my studies I have found that in metropolitan areas one operating mechanism may be advantageously employed to serve approximately 100 cars or storage spaces. This permits a car to be stored or delivered in approximate interval of one minute. This is as high speed as is necessary or practicable and will take care of all peak load traffic conditions found in congested districts.

Since where high speed of operation is required the operating mechanism may be common to approximately 100 storage stalls, the height of the building determines the size of the elevator employed. To carry the operating mechanism, that is in buildings of from 14 to 20 stories, a 3 position elevator of approximately 20 feet square is employed. In buildings of from 21 to 30 floors a two position elevator is employed, while in the taller buildings, a one position elevator may be used. The positioning mechanism carried by the elevators is adapted to receive a car at the loading station, draw it into position on the elevator, move it transversely until in alignment with the proper stall during the movement of the elevator and discharge it into the predetermined stall when the elevator arrives at the proper floor. This operating or positioning mechanism is also capable of operating in a similar manner to remove a car from one of the storage stalls and deliver it at the delivery station. The positioning mechanism on the elevator is automatically operated so that the mechanism is adapted to shift an automobile into a stall immediately upon the elevator arriving at the proper floor or to remove a car therefrom. Protective arrangements are of course provided so that it is impossible to improperly position the car, that is, the doors leading to a particular stall will not open unless the elevator is properly positioned at that floor. This automatic mechanism is of such nature that an elaborate type of building construction is unnecessary since the load of the stored cars is carried directly to the steel building structure. Substantially no flooring is necessary except that which is required for fire protection.

Referring now to the drawings:

Fig. 5 is an elevation of the automatic positioning mechanism for handling the vehicle;

Fig. 6 is a plan of the transfer truck that actually moves the automobile;

Fig. 7 is an elevation along the line 7—7 of Fig. 6, looking in the direction of the arrows;

Fig. 8 is a top plan view of the automatic handling mechanism showing the carrier frame, transfer frame and transfer truck;

Fig. 9 is a plan view of the carrier frame with the transfer frame and transfer truck lifted therefrom;

Fig. 10 is a section of the automobile handling mechanism along the line 10—10 of Fig. 8;

Fig. 11 is a similar section along the line 11—11 of Fig. 8 looking in the direction of the arrows;

Fig. 12 is a plan view of the end of the automobile handling mechanism showing the track extension in operated position;

Fig. 13 is a similar view showing the track extension in its inoperative position;

Fig. 14 is an end elevation of the automobile handling mechanism showing the track extension and is taken along the line 14—14 of Fig. 13, looking in the direction of the arrows;

Fig. 15 is a side elevation of the automobile handling mechanism partially in section showing the operating mechanism for the track extension, taken along the line 15—15 of Fig. 12 looking in the direction of the arrows;

Fig. 16 is a section of the automobile handling mechanism showing the operating mechanism for the track extension and is taken along the line of 16—16 of Fig. 14, looking in the direction of the arrows;

Fig. 17 is a plan view of the tracks employed for carrying the automobile in the storage stalls;

Fig. 18 is a side elevation of the storage rack, taken along line 18—18 of Fig. 17, looking in the direction of the arrows;

Fig. 19 is an end elevation of the same, taken along line 19—19 of Fig. 17, looking in the direction of the arrows;

Fig. 20 is a straight line diagram of the control circuits for operating the automobile handling mechanism.

Figure 1:
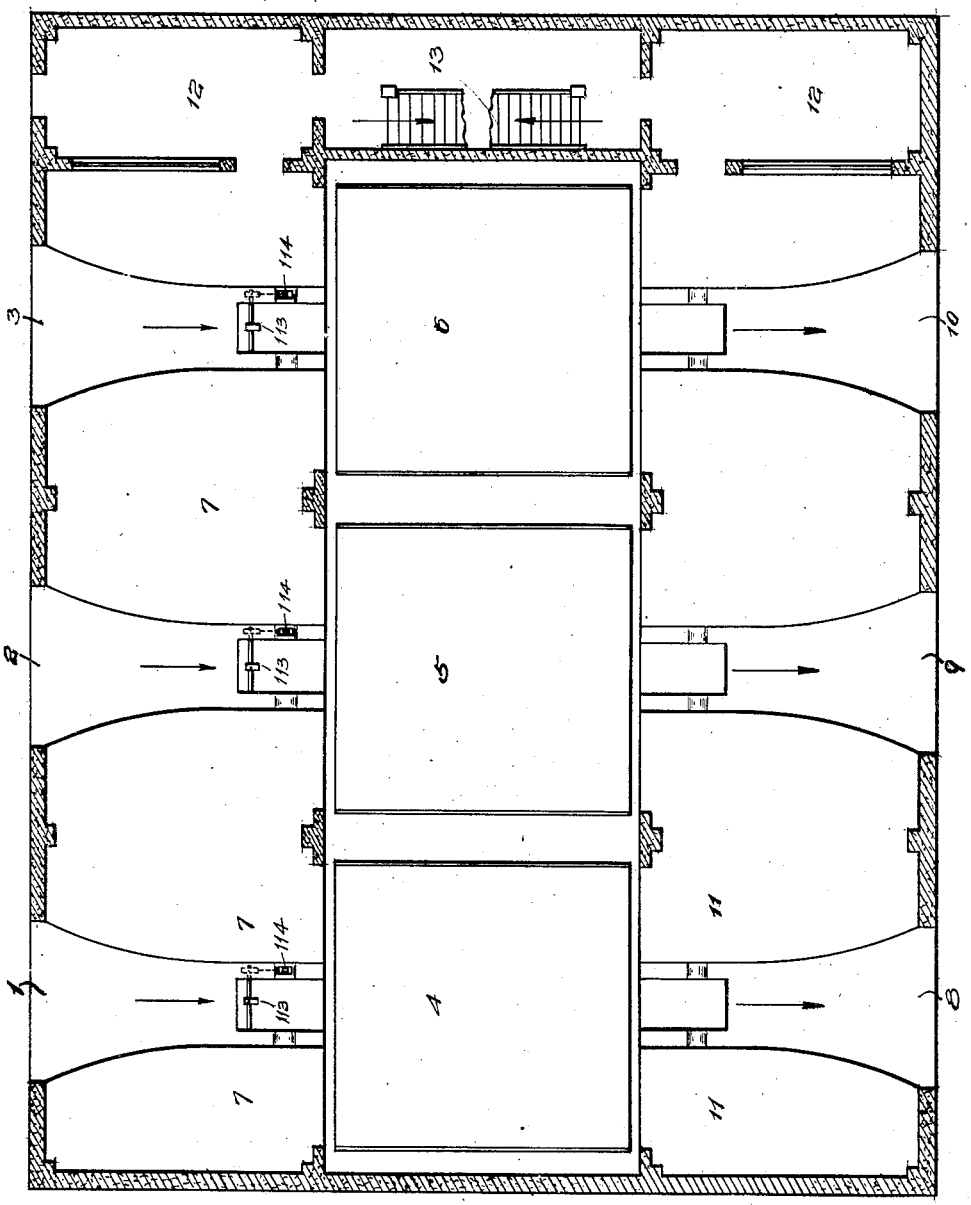
Fig. 1 is a ground floor plan of a typical garage in which my invention is installed.

While in the drawings my invention has been shown applied to a garage structure built in the form of a rectangle with entrances on one side and exits on the other, it will be appreciated that the invention is not limited to a construction of this type, but may be applied to any form of garage, even those having an entrance and exit on the same side. While only 3 elevators are shown one or more may be advantageously employed depending on the size of the ground the garage is to be built on. It will also be appreciated that this garage structure may form part of a combination building, for example, an office building, theatre, hotel, and garage. A combination building of this type is very desirable since it is possible to have the garage structure in what would otherwise be part of the court, the height of the garage floors being the same as that of the other part of the building, so that the height of the garage structure is immaterial. This permits the combination structure to employ one hundred per cent of its ground with all outside offices. It is found that the earnings of the garage structure are far in excess of the revenue that would be derived from inside offices on a court. All this will become clear in the following description.

In the accompanying drawings, like reference numerals refer to same parts throughout.

In Fig. 1 of the drawings the typical garage structure shown is provided with three entrances, 1, 2 and 3. The entrances 1, 2 and 3 open on driveways that extend to three elevators 4, 5 and 6. These elevators are illustrated as the three position type, that is the height of the building may be somewhere between fourteen and twenty floors, the approximate capacity of the garage shown being 300 cars for high speed operation. Automobiles entering in one of the entrances drive into a position opposite one of the elevators under their own power. The automobile engine is then turned off and the car may be locked in any manner desired. The automobile is not moved under its own power until after the delivery to the customer. Raised platforms 7 provide for properly aligning the wheels of the automobile so that they are in straight line and may be constructed as an integral part of the floor. Each of the entrances such as 1, 2 or 3 may be provided with doors that are ordinarily automatically operated. Each elevator such as 4, is of sufficient width in the present instance so that three cars may be placed thereon. However, the automatic automobile handling mechanism carried on the elevator is adapted to handle only one car at a time, though by means of this mechanism it is possible to place the automobile into any one of six storage stalls on any floor as will appear. These elevators are preferably of the high speed type, capable of a vertical movement of approximately 500 feet per minute. This value is merely arbitrary and may be varied as desired.

Exits 8, 9 and 10 are provided at opposite sides of the building on the ground or loading floor, and are fitted with suitable doors that may be operated in any desired manner. The floor is raised on either side of the roadway leading to the exits, in order to form a trackway for the vehicle. This insures that the vehicle will be properly guided toward the exits. From this construction of the ground floor, it will be seen that the vehicle handling mechanism on the elevator must be adapted to take the vehicle from the middle entrance position, place it on the elevator, discharge it into any one of six storage stalls and to be able to take a vehicle from any one of the six storage stalls on any floor and place it in position before the middle exit on the elevator for delivery. It will be appreciated that this construction may be modified somewhat. That is, the entrances or exits to the garage may be on different floors, for example, the entrances may be on the first floor and the exists in the basement. However, the operation is substantially the same. On the ground floor, waiting rooms 12 may be provided in addition to accessory sales rooms, gasoline pumps, and the like. A stairway 13 is usually provided in order to give access to the various floors for fire protection or other purposes. Each of the elevators moves in a shaft or hatchway which extends upward toward the top of the building. A by-pass type of fire door is, of course, provided on either side of each elevator at every floor so that the elevator shafts are completely closed while the elevators are running. These fire doors do not have to be of the truckable sill type for reasons which will appear. These doors may be automatically operated when the elevator comes to a position to receive a car or discharge a car or to place a car in storage.

So far as the building construction is concerned, it is ordinarily the usual type of steel or reinforced concrete construction. The individual storage stalls are simply made up of standard structural shapes forming trackways adjacent to each other and arranged tier on tier. In the construction shown, there will be 18 stalls per floor. The load of the vehicle is carried by the steel framework of the building and the different tiers are separated each from the other by comparatively light floors.

Figure 2:
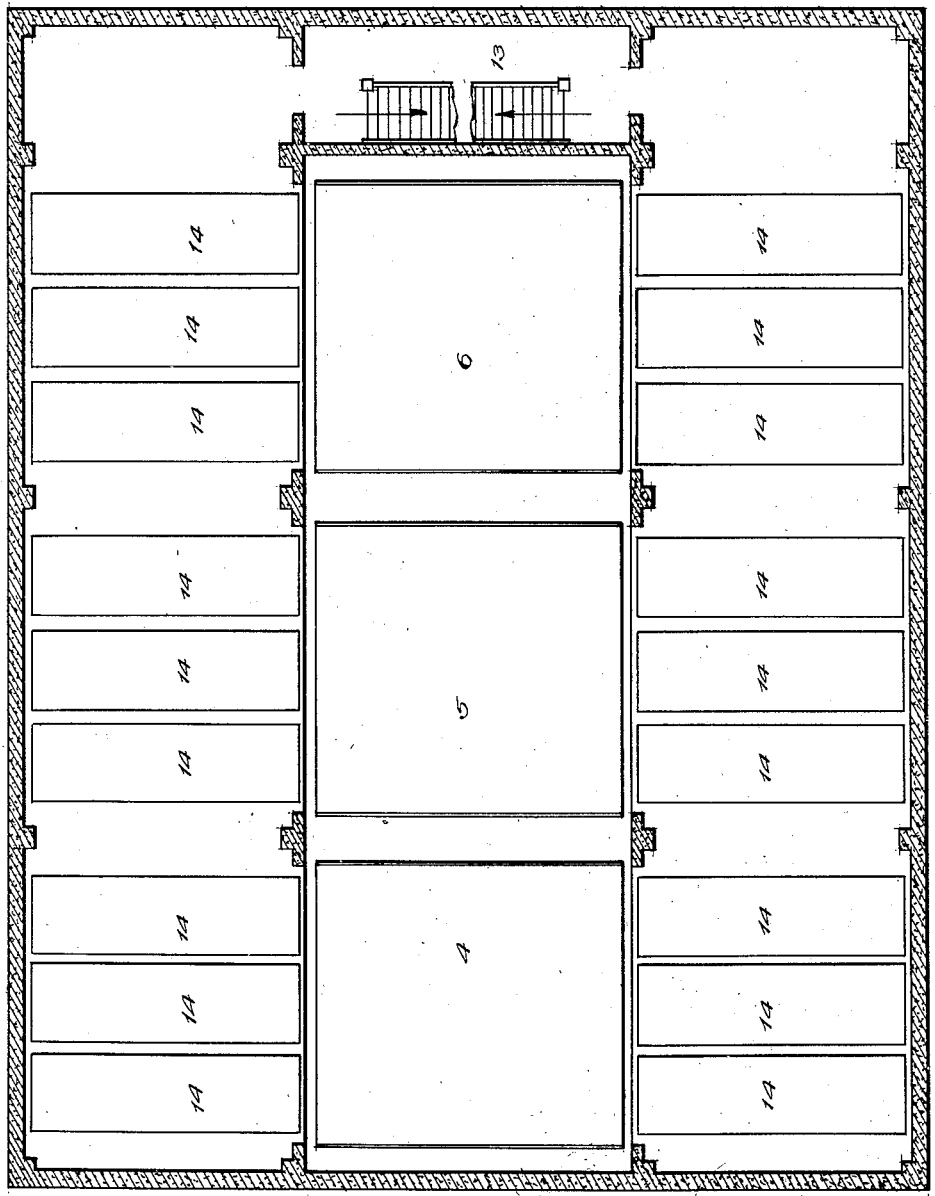
Fig. 2 is a typical floor plan of one of the storage floors in the garage of Fig. 1.

Fig. 2 illustrates a typical plan of one of the storage floors showing each of the three elevators having access to six storage stalls 14, three on each side. It will be understood that each of the storage floors are laid out in a similar manner. Thus the automobile vehicle handling mechanism mounted on the elevator must be able to place a car in any one of the six storage stalls served by one of the elevators on which it is mounted or to withdraw a car therefrom.

Figure 3:
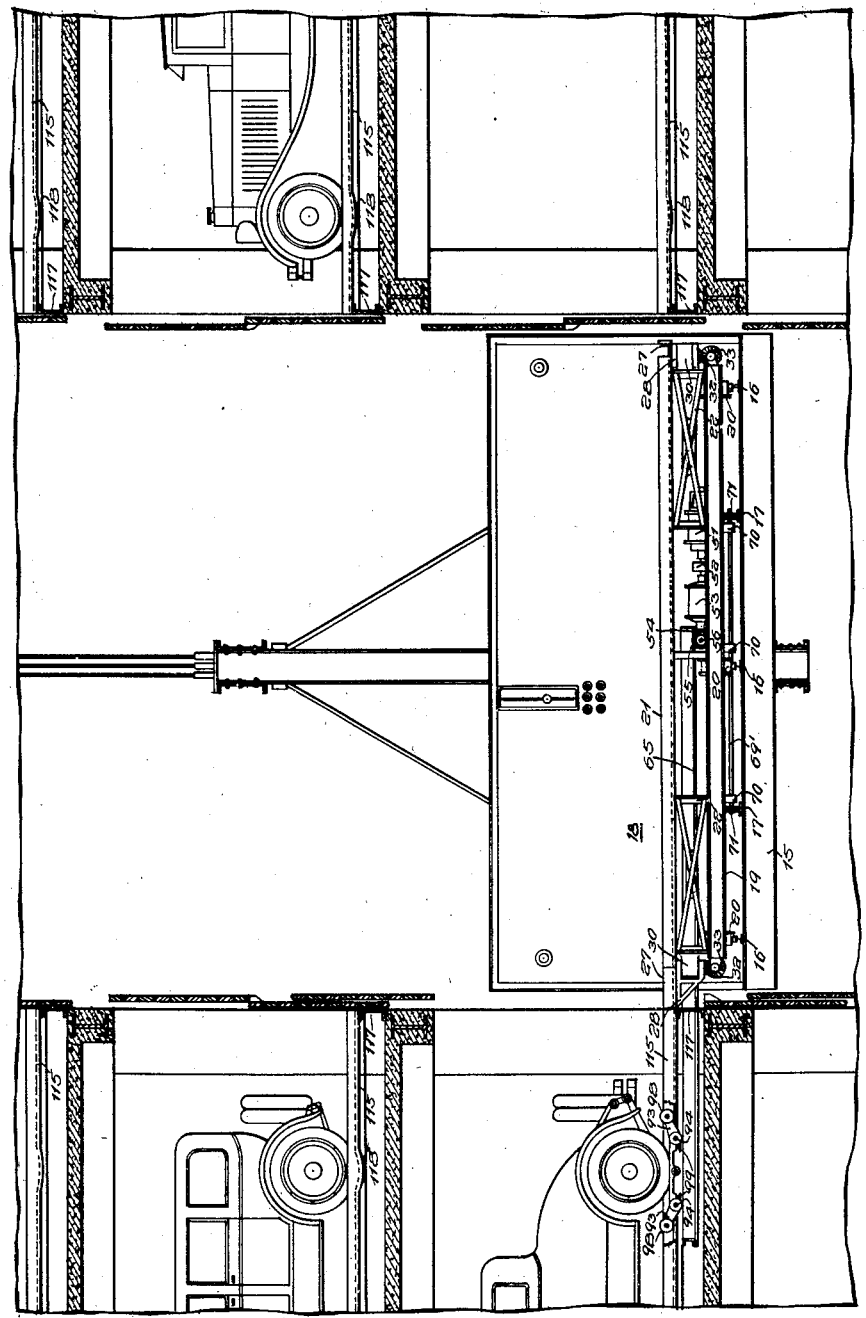
Fig. 3 is a partial sectional elevation through the garage elevator hatch and the storing mechanism on one of the elevators showing an elevator with its operating mechanism in position to place one of the automobiles in storage or take it therefrom, being along the line 3—3 of Fig. 4.
Figure 4:
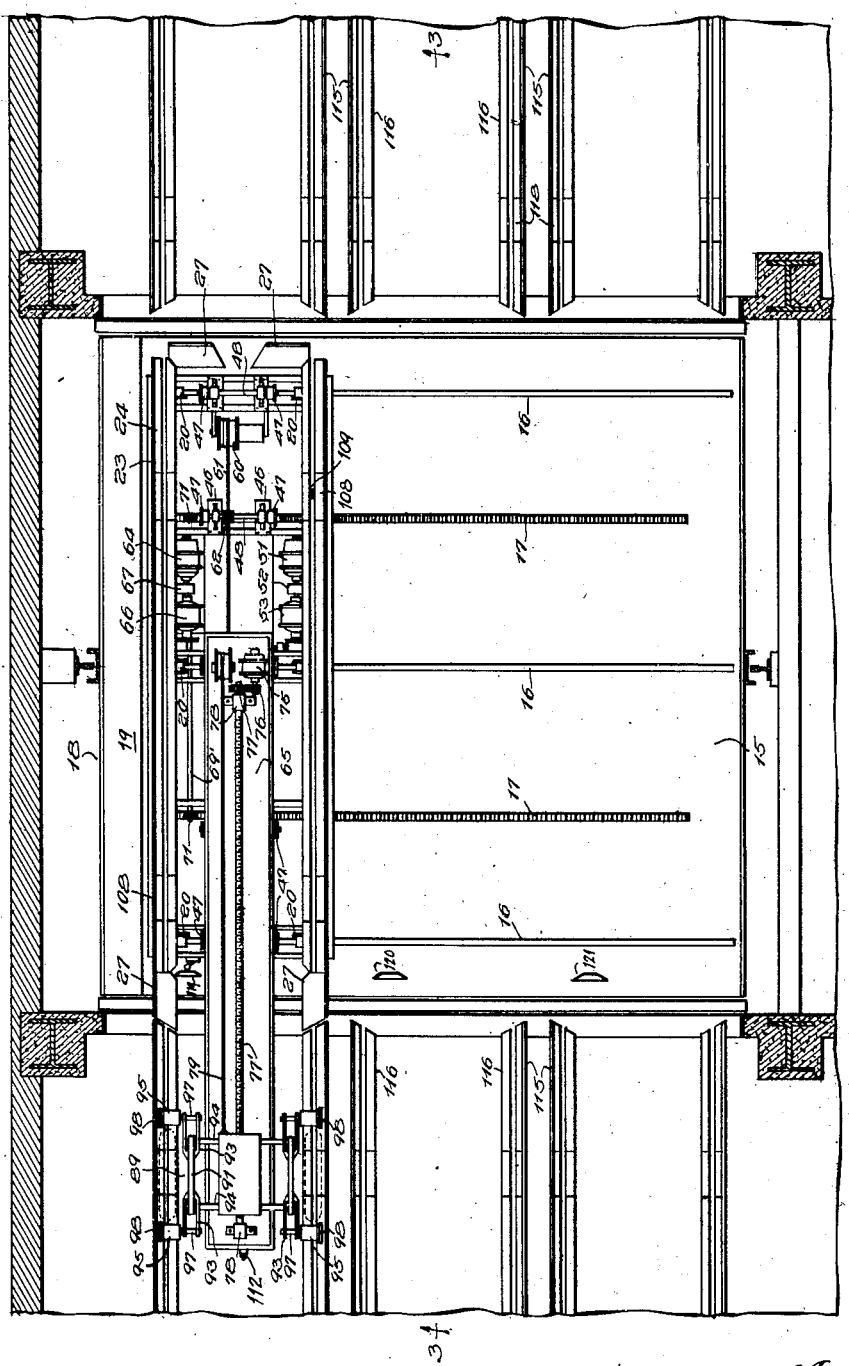
Fig. 4 is a plan of the elevator proper showing the positioning mechanism in an extended position in one of the storage stalls.

Fig. 3 gives a sectional view of the car handling mechanism placing an automobile in the lower stall to the left or about to withdraw a car therefrom. This car handling mechanism is mounted upon the elevator platform 15. The elevator platform 15 is provided with three rails 16 running transversely to the stalls. Two racks 17 of any usual or well known construction are also mounted upon the elevator platform 15 and serve to bring about a transverse movement of the car handling mechanism 18, (Fig. 4). The car handling mechanism comprises a carrier frame 19 mounted upon flanged wheels 20 travelling on the rails 16. The carrier frame 19 (Fig. 9) is rectangular in shape and is formed from standard structural shapes suitably fastened together. The wheels 20 supporting the carrier frame are preferably of roller bearing construction in order to reduce the friction. It will be understood that while I have shown six wheels supporting the carrier frame, a smaller number may be employed. The carrier frame carries on either side the automobile wheel tracks 21 which are mounted upon suitable supporting structures 22. The wheel tracks comprise two angles 23 and 24 (Fig. 10), one leg being upstanding and the other leg inverted. These angles are held together by a clip angle 25 which is adjustably mounted on supporting structure 22 by clips 26. This provides means for adjusting the spacing between the two tracks so as to obtain a mean spacing that will accommodate all automobile wheel gauges.

At each end of the carrier frame, there are provided two movable track extensions 27 that operate to bridge the gap between the carrier tracks and the tracks in the storage stalls. Each of the extension tracks 27 is carried upon a rotatable bracket 28 (Fig. 14) of a triangular shape. The bracket 28 is pivoted upon a shaft 29, rotatably held in a bracket 30, bolted to the carrier frame 19. The bearings 31 (Fig. 15), are preferably of the anti-friction type taking both a thrust and a radial load. At one end of the shaft 29 suitably affixed is a bevel gear 32 that is adapted to mesh with another bevel gear 33 double in size to the bevel gear 32. A bevel gear 33 is keyed to the shaft 34 so that it is adjustable with the bracket in a manner that will be described. The shaft 34 is mounted in bearings 35 affixed to the carrier frame 19. In order to provide for the varying gauge of automobiles, it is necessary that the extension tracks be also adjustable. This is accomplished by means of slotted holes 36 in the bracket casting 28. The extension track brackets are adjusted by means of slotted holes 36. The bevel gears 33 may also be adjusted on the shaft 35 to take up the play. It will be appreciated that the extension tracks are provided on either end of the carrier frame and are constructed in identically the same manner as described. The shaft 34 has affixed thereto an operating lever 38 held in upstanding position by a spiral spring 39 guided by a pin 40 mounted in the carrier frame 19. This operating arm is provided at its upper end with a roller 41 mounted upon a shaft 42. The arm 40 provides for rotation of the shaft 34 under certain conditions of the operating mechanism. The shaft 34 is also provided with a handle 43 for manual operation under certain conditions as will appear.

The supporting wheels of the carrier frame are held in place by suitable mounting brackets 45 (Fig. 9). A plurality of flanged wheels 47, ten in number, are mounted upon the cross members of the carrier frame 19 (Fig. 9). The mounting plates 46 serve to hold the wheels 47 in position. An axle 48 connects each pair of wheels 47. The carrier frame also has mounted upon it the electric control equipment comprising the various switches and relays necessary to control its operation. This control mechanism is mounted upon either side of the transfer frame in the control boxes 49. An L shaped platform or bed plate 50 is also carried at one side of the carrier frame. A 3 H. P. electric motor 51 is suitably mounted on this platform and serves to drive the bevel gear 54 through the gear reducing mechanism 53 and in suitable brake 52. The gear reducing mechanism 53 may be of any well known or approved type as may the brake 52. The function of the brake 52 is to stop the motor rotation when the motor circuit is opened. A bevel gear 55 is mounted upon the shaft 56 and is adapted to mesh with the bevel gear 54. The shaft 56 is held in suitable bearings 57 and 58 mounted upon the base 50. The other end of the shaft 56 carries a pinion 59 which meshes with a rack 84 (Fig. 10) carried on the under side of the transfer frame 65. A cable reel 60 is suitably mounted at one end of the carrier frame and carries cable 61 that passes over the idler pulley 62 and is adapted to supply energy to the electric mechanism carried by the transfer frame and the transfer truck. On the opposite side of the carrier frame from the platform base 50 there is another base 63 which carries a 5 H. P. electric motor 64 that is adapted to operate a sprocket 65 through the medium of the gear reducer 66. A brake 67 is also provided for the purpose of bringing the rotation of the motor shaft to an abrupt stop. The sprocket 65' is adapted to transmit power to the sprocket 68 through the chain 69 (Fig. 10). The sprocket 68 is mounted upon the shaft 69' which rotates in suitable bearings 70 (Fig. 5) and carries at each end a pinion 71. The pinions 71 are adapted to mesh in the racks 17 and when the shaft 69' is rotated, are adapted to move the carrier frame 19 transversely across the elevator platform 15 (Fig. 4).

The transfer frame 65 is adapted to be mounted on and carried by the flanged wheels 47 of the carrier frame (Figs. 9 and 10). The transfer frame comprises two channel members 72 suitably bolted to a plate 73. Suitable angles 74 are bolted with their upstanding legs forming a track upon which the transfer frame 65 rests on the flanged wheels 47, carried by the carrier frame 19. A motor 75 is mounted upon one end of the plate 73 of the transfer frame 65, (Fig. 8) and drives a spur gear 76. The spur gear 76 is adapted to mesh with a second spur gear 77 attached to one end of the transfer truck operating screw 77'. The transfer truck operating screw 77' is held in place in suitable bearings 78 at either end, bolted to the plate 73 of the transfer frame 65. A cable reel 78' of any usual or well known type is mounted upon the transfer frame plate 73 and adjacent to the motor 75. The cable reel 78' carries a cable 79 that is adapted to supply energy to the electric equipment on the transfer truck 80. The transfer truck 80 comprises essentially a steel casting 81 that is supported on four flanged roller bearing wheels 82 (Figs. 6 and 7) that run on rails 83 mounted upon the platform 73 of the transfer frame. These rails 83 extend longitudinally on the transfer frame. The steel casting 81 is adapted to be propelled by the operating screw 77' through the medium of the bushed nuts 84 at each end of the truck. These bushed nuts 84 are bolted in position on the transfer truck structure 81 so that they may be readily removed. An electric motor 85 is suitably mounted on the transfer truck structure and drives a bevel gear 86. The bevel gear 86 is adapted to mesh with the bevel gear 87, splined to the shaft 88 which forms on either side the roller arm spreader screws 89. The shaft 88 is supported on the truck frame 81 by means of the bearings 90 which may be of the anti-friction type, and is kept from shifting by collars 90'. On either side of the truck there is positioned a roller arm spreader 91 which is adapted to be moved in and out by the operation of the screws 89 and the bushing nuts 92. To each end of the roller arm spreaders 91 there is rotatably fastened a roller arm 93. A roller arm guide shaft 94 is positioned at each end of the truck and adjustably held in place by set screws 95'. At the end of each roller arm 93, there is pivotally mounted a roller 95 on a shaft 96. The open ends of the roller arms being held against inward movement by tubular sleeves 97. At the end of each roller shaft 96, there is provided a roller idler wheel 98 of slightly larger diameter than the diameter of the roller 95. The four rollers 95 carried by the transfer truck are adapted to engage the vehicle wheels when in extended position, as shown by the dotted lines. The idler rollers such as 98 are for the purpose of reducing the friction encountered in moving the vehicle as they take the load of the car. In order to maintain the roller arms 93 in their proper position, the roller arms are provided with extensions 99 through which are fitted pins 100 that serve as guides for the roller arm springs 101 (Fig. 7). These springs serve to thrust the roller arms and consequently the rollers upward. Suitable grease cups 102 may be provided for proper lubrication. A limit switch 104 is mounted upon the transfer truck and is adapted to be operated through the medium of the limit switch shaft 105 (Fig. 6). The limit switch shaft 105 carries stops 106 that determine the operating time of the limit switch 104. The limit switch 104 is adapted to control certain control circuits as will appear. The cover plate 107 is provided for the purpose of protecting the gears and motor from dirt and injury.

The automobile tracks formed by the angles 23 and 24 carry concave depressions 108 at one end (Fig. 8). These depressions are for the purpose of maintaining the automobile in position upon the carrier frame. The automobile wheel tracks formed by the angles 23 and 24 are separated and this separation serves as a guide for the automobile wheels. In one of the track depressions 108, there is mounted an electric switch 109 that has a trigger projecting through the open space between the wheel tracks, (Fig. 8). This switch is adapted to be operated by the automobile wheel.

The electrical circuits are controlled by switches that are mechanically operated through the movement of the vehicle handling mechanism. Thus the transfer frame carries two limit switches 110 and 111 which control the movement of the transfer truck 80 on the transfer frame 65. The transfer frame 65 also carries a limit switch 112 at its loading end. This limit switch is adapted to be operated by a mechanical trigger 113 controlled through the medium of a bell crank 114 that is operated by the automobile wheel when it is properly positioned in the depression at the loading station. There are a number of other switches which serve to control the electric circuits and whose operation and function will be more specifically described in the discussion of the electrical operating circuits.

In order to provide stalls for the vehicles, the plurality of tracks are spaced apart so that there are two tracks forming a runway for the vehicles in each of the storage stalls 14. The construction of these tracks can be seen in Figs. 17 to 19, inclusive. The tracks are formed by angles 115 and 116 being laid parallel to each other and bolted into place upon channel brackets 117. The angle 115 has its leg upstanding, while the angle 116 has its leg extending downwards. These angles 115 and 116 forming the trackway are held in position by clips so that their spacing may be altered to compensate for variations in the gauge of automobiles. I have found that by the use of this angle type of track construction, a mean spacing may be employed which will accommodate all gauges of vehicle wheels. There is a rounded depression 118 in each of the tracks in a vehicle stall and this depression serves to lock the car against movement. The location of the depression 118 in the wheel tracks 115 and 116 of the storage racks may vary depending upon whether the rear or front wheels of the vehicle are placed in same. As the center line of the vehicle is not changed in a storage operation the rear wheels of the vehicle would rest in the depressions when placed in storage in any of the racks on one end of the elevator hatch. In the case of the storage racks of the other end of the elevator hatch the front wheels would rest in the depressions. For this reason it can be seen that the location of the depressions will vary as the rear overhang of an automobile is greater than the front. The variation in the depressions is provided for by limit switch contact in the travel of the transfer truck.

The ends of the tracks facing the elevator hatchway are cut diagonally so that the swinging track brackets 27, the ends of which are cut on a complementary angle so as to form a continuous trackway from the vehicle storage stalls to the tracks 21 carried by the carrier frame, (Fig. 4). This permits the automobile to be moved from the carrier to the storage stall over the continuous trackway and eliminates the use of a truckable sill type of fire door. By forming trackways of angles such as 115 and 116, (Figs. 17, 18 and 19) a great deal of friction between the automobile wheel tires and the trackway is eliminated. That is, there is only the possibility of the automobile tire encountering one upstanding leg of the trackway instead of on both sides. This permits the car to be moved with the minimum application of power.

I shall now briefly outline the operation of the car handling apparatus in taking a car from the loading station to a storage stall and in taking a car from a stall to the delivery station, and shall then give a detailed description of the electrical circuits controlling the functioning of the car handling equipment, together with the equipments operation.

It will be assumed that a customer drives his automobile into one of the entrances of the garage such as 1 (Fig. 1) and places the car at the loading station before an elevator 4 with the front wheels resting in the depressions so as to operate the bell crank lever 114 and place the trigger 113 in the proper position to function with switch 112 when the transfer frame is projected. The elevator operator depresses the loading button corresponding to the middle position of the car and the carrier frame is moved transversely into this position, if it is not already there, by the operation of the motor 64, and the pinions 71 co-operating with the racks 17, (Fig. 3). When in the loading position as determined by the operation of the limit switch controlled by the movement of the carrier frame 19 the circuit of the motor 64 is opened and the brake 67 is operated to bring the carrier frame to rest before the loading station with the trackways 21 on the carrier frame in alignment with the vehicle wheels. The vehicle wheels are properly directed by the raised platforms 7 in the entrance way. The transfer frame 65 is now extended through the operation of the motor 51, the pinion 59 and rack 84. Simultaneously therewith the motor 75 is energized to drive the transfer truck 80 through the medium of the operating screw 77', (Fig. 4). By the operation of the motor 51 the transfer frame is extended until it assumes the position with its end under the front portion of the vehicle, and the limit switch 112 operated by the trigger 113. The transfer frame is operated by the rack and pinion 59 and 84 respectively, its load being supported on the wheels 47 of the carrier frame. A limit switch determines the extent of movement of the transfer frame and de-energizes the motor 51 and sets the brake 52. When the transfer truck 80 reaches its limit of movement as determined by the limit switch 110 it is positioned in alignment with the front wheels of the vehicle. The extension of the transfer frame 65 brings about the operation of the trigger arm 38 and compresses the spring 39 (Fig. 16). The rotation of the trigger arm 38 rotates the shaft 35 a quarter of a revolution and through it brings about the rotation of the brackets 28 supporting the extension trackways 27 a half revolution so as to form a trackway over which the vehicle can pass, (Fig. 15). When the transfer frame and transfer truck have been extended in the manner described, the motor 85 on the transfer truck is energized to rotate the operating shaft 88 (Fig. 6) and to bring about the outward movement of the roller arms 93 so as to place the rollers 95 on either side of the two front wheels of the vehicle. The operating shaft 105 of the limit switch 104 is then operated to bring about the stopping of the motor 85, and the initiation of the return movement of the transfer frame 65 and the transfer truck 80. The transfer frame and transfer truck now co-operate to move the vehicle on to the tracks 21 of the carrier frame. The movement of the transfer frame being stopped in its normal center position by a limit switch 125, (Fig. 9), the movement of the transfer truck ceases when the back wheels of the vehicle strike the depression 108 of the tracks 21 by the limit switch 109, (Fig. 8). Thus the automobile has its rear wheels in a certain definite position. The elevator operator notes what storage stall the car is to be positioned in and on what floor the storage stall is located. The elevator operator then sets the destination of his elevator to that floor and presses one of six buttons corresponding to one of the six stalls assigned to the elevator 4 which determines the stall to which the vehicle is to be placed in (Fig. 3). If the vehicle is to be placed in a stall other than the middle one, the carrier frame is moved in a similar manner to that described to position itself before this stall while the elevator is moving to the desired floor. When the desired floor is reached, the door on the proper side of the elevator giving access to the predetermined stall automatically opens and the transfer frame and the transfer truck is automatically extended to move the vehicle into the proper storage stall with its wheels resting in the depressions in the storage stall tracks. The motor 85 on the transfer truck is then operated to withdraw the rollers to their normal position and the transfer frame moved back to normal. The elevator may then be returned to the loading floor. This is the normal operation in the event a vehicle is stored in one of the storage stalls on the same side of the building from which it was loaded. The operation is somewhat different in the event that the elevator operator selects a stall on the opposite side of the building. In this event the operation of the button corresponding to the storage stall initiates the transverse movement of the vehicle carrier in the same manner as before and in addition brings about the energization of the transfer truck motor 85 so as to withdraw rollers from position on either side of the front wheels of the vehicle. The car is held in position on the carrier frame by the depressions 108 in the trackway. When the roller arms have assumed their normal position the motor 75 is energized to drive the transfer truck to the other end of the transfer frame into position opposite the rear wheels of the vehicle. The transfer truck motor 85 is now operated to bring about an extension on the roller arms until they are on either side of the vehicle wheels. When the proper storage floor is reached, the door, which by the way is common to the 3 vehicle stalls on that floor, is automatically opened and the transfer frame and transfer truck are operated as before to run the vehicle into the predetermined storage stall with the rear wheels of the vehicle resting in track depressions 118 in the stall (Figs. 3 and 4). The transfer truck motor 85 is then operated to withdraw the roller arms into their normal position. The transfer frame is then returned to its normal position, the extensible trackways 27 returning to their normal position by a rotation of the shaft 33 under the influence of the spring 34 as the transfer frame goes into its normal position, (Figs. 15 and 16). The elevator may now be returned to its loading floor in any well known manner.

When it is desired to withdraw a vehicle from storage, all that is necessary for the elevator operator to do is to set the destination of his elevator to the proper floor and depress the push button corresponding to the stall desired. During the upward movement of the elevator the carrier frame is moved in the manner described until it is in position with its tracks in alignment with the tracks of the storage stall. The transfer frame is then projected as is the transfer truck, until the rollers are positioned adjacent to the vehicle wheels. The transfer truck motor 85 is then energized to extend the roller arms on either side of the vehicle wheels. After this operation the transfer frame and transfer truck are operated so as to bring the vehicle on to the carrier trackway. The elevator may then be dispatched to the discharging floor, the door of the storage floor automatically closing in any well known manner. When the elevator reaches the delivery floor, the operator depresses the push button corresponding to its discharge position and the vehicle is moved by the operation of the carrier transfer truck and transfer frame until it is positioned in discharge passageway. The transfer truck motor 85 is now operated to withdraw the roller arms from engagement with the vehicle wheels and the transfer frame is moved to its proper center position on the elevator.

In the event that an automobile is taken from a storage stall on a side of the garage opposite to the discharge station, the transfer truck is positioned after the vehicle has been placed upon the vehicle carrier in substantially the same manner as before described. The other operations all occur in the same manner as described.

Attention is directed to the fact that since one set of vehicle wheels of the car are always placed in the predetermined position on the carrier, the variation in the wheel base of the vehicle does not in any way interfere with the automatic handling equipment.

The manner in which the electrical control circuits function to control the operation of the vehicle handling equipment will now be described. In order to do this, it will be assumed that the elevator 4 is opposite the loading floor and in position to receive a car. In order to bring about the loading of the car the elevator operator will depress the E3 button since the loading station is in the middle position of the transverse carrier and to the east thereof. The operation of the E3 button completes a circuit which extends from the positive side of the battery through the fuse 230, interlock switch 220, contacts of the push button E3, relay 202, resistor 225', emergency stop switch 228 and fuse 229, to the negative side of battery. Interlock switch 220 has its contacts closed at this time since this switch is closed when the transfer frame is in normal unextended position. The relay 202 is thereupon energized to attract its armature 208. It will be assumed that the carrier frame is in one of the end positions, namely, the position to the north of the center position. Under these conditions the switch 223 has its contact making member 226 in engagement with its contact member 224. The operation of the relay 202 thereupon completes a circuit which extends from the positive terminal from the source of current, interlock switch 220, contacts of the push button E3, contacts of the relay 202, armature 208, contact making member 226, contact member 224, normally closed contacts I—1, relay H, limit switch 222, emergency switch 228, and fuse 229 to the negative terminal of the source of energy. The relay H is energized over this circuit and closes a circuit for the motor 64 so that the carrier frame 19 is moved transversely toward the center of the elevator platform 15. The operation of the relay 202 also serves to complete a circuit which is the same as the one previously traced as far as the contacts and armature of the relay 202 and thence proceeds through the normally closed contacts J—2, relay J, normally closed contacts T—4 and U—4, emergency switch 228, and fuse 229 to the negative terminal of the source of energy. The relay J is energized over this circuit and establishes a locking circuit for itself at the contacts J—1 and opens its original energizing circuit at the contacts J—2. The operation of the relay J is without particular function at this time. The operation of the relay H also serves to complete a locking circuit for the relay 202 by way of the contacts H—2, exclusive of the contacts of the push button E—3. This circuit serves to maintain the relay H energized even though the push button E—3 is released. When the carrier frame 19 reaches its center position, the contact making member 226 of the switch 223 is swung into its open position away from the contact member 224 and contact member 225. The relay 202 is immediately de-energized as is the relay H. The de-energization of the relay H serves to open the circuit of the motor 64 and to complete a circuit for the brake 67 whereupon the transverse movement of the carrier frame 19 is stopped with its tracks in alignment with the automobile wheels at the loading station. There is now a circuit completed for the relay L, provided the carrier frame is properly aligned. This is controlled through the cam switch 245 which is carried by the carrier frame and is operated by one of three cams, 119, 120 and 121, on the elevator platform 15. It will be assumed that the carrier frame is in proper alignment and that the contacts of the switch 245 are closed. The switches 246 and 247 are controlled by a cam on the door of the elevator hatch at every floor, including the loading floor and these switches are closed if the door is open and the elevator properly leveled either automatically or by hand. There is now a circuit completed which extends from the positive terminal of the source of energy, fuse 230, contacts of the switch 245, contacts of the switch 246, contacts J—2, which have been closed by the operation of the relay J, normally closed contacts P—1, normally closed contacts O—2, time element or dash pot relay L, normally closed contacts H—3, normally closed contacts I—3, normally closed contacts T—4, normally closed contacts U—4, emergency switch 228 and fuse 229 to the negative terminal. The relay L is a timing relay and takes a short interval of time to operate its contacts. When the relay L operates, there is a circuit completed which extends from the positive terminal, fuse 230, contacts L—1, contacts J—3, relay M, transfer frame east limit switch 231, normally closed contacts H—3, normally closed contacts I—3, normally closed contacts T—4, normally closed contacts U—4, emergency stop switch 228, and fuse 229 to the negative terminal. The relay M is energized over this circuit and serves to complete a circuit for the motor 51 in such direction as to direct the transfer frame eastward into the loading pit. The motor 51 has the usual accelerating resistances and the switch 248 is closed through the operation of the accelerator on motor 51. A circuit is thereupon completed, extending from the positive terminal, fuse 235, switch contacts 248, contacts M—1, relay Q, limit switch 235, emergency stop switch 228, and fuse 229 to negative terminal. Limit switch 235 determines the eastward movement of the transfer truck. The relay Q is energized and operates to complete a circuit for the motor 75 in such direction as to drive the transfer truck 80 to its eastward position. The speed of the motor 75 is such as to drive the transfer truck 80 to its outward limit before the transfer frame motor 51 has extended the transfer frame to its outward position. When the transfer truck reaches its limit the switch 235 is operated and the relay Q is de-energized to open the circuit of the motor 75 and stop the operation of the transfer truck 80. When the transfer frame is extended to its proper position, the switch 231 is opened and the relay M is de-energized to open the circuit of the motor 51 and to complete a circuit for the brake 52. When the relays M and Q have de-energized, there is a circuit completed which extends from the positive terminal fuse 230, contacts L—1, contacts of switch 260', contacts of switch 261', normally closed contacts T—3, normally closed contacts P—7, relay U, contacts of the switch 239, contact member 250 of the switch 241, contact making member 249, emergency switch 228 and fuse 229 to the negative terminal. The switch 260' is closed when the transfer frame is extended into its furthermost east position and the switch 262 is closed when the transfer frame is extended to its furthermost west position. The switch 261' is closed when the transfer truck is extended to its furthermost east position and the switch 263 is closed when the transfer truck is in its furthermost west position. The switch 239' is on the transfer frame and is operated by the trigger switch 113 located in the loading pit, if the wheel of the vehicle is properly positioned therein, the switch 240 having been opened at the loading floor by the operation of a door cam. The switch 241 has its contact member 249 in engagement with the contact member 250 since the roller arms or roller arm spreaders are in their normal unextended position. The relay U is immediately operated to complete a circuit for the motor 85 in such direction as to bring about an extension of the roller arms so that the rollers 95 are on either side of both front wheels of the vehicle. When in this position the switch 241 is operated so that its contact making member 249 is swung into engagement with the contact member 251, whereupon the relay U is deenergized to open the circuit of the motor 85. The switch 241 has been designated in the mechanical description of my invention as 104. When the relay U is operated the circuit of the relay L is opened at the contacts U—4 and the relay L is de-energized. When the transfer frame is into its east extended position, the switch 239 has its contact making member 253 in engagement with its contact member 255. Now when the relay U is de-energized, there is a circuit completed which extends from the positive side of the source of current, fuse 230, normally closed contacts L—2, normally closed contacts U—1, normally closed contacts T—1, contact making member 253, contact member 255, relay N, limit switch 232, normally closed contacts H—3, normally closed contacts I—3, normally closed contacts T—4, normally closed contacts U—4, emergency stop switch 228, and fuse 229, to the negative terminal of the source of current. The The limit switch 232 adapted to be operated when the transfer frame is extended into its furthermost west position. The relay N is operated to complete a circuit for the motor 51 in such direction that the transfer frame 65 is moved in westward. The operation of the accelerator closes the contact of the switch 248 and there is a circuit completed by way of these contacts, contacts N—1 relay R, contact member 261 of switch 238, contact making member 260 of said switch, limit switch 236, and thence to the negative terminal. The limit switch 236, is operated when the transfer truck reaches its furthermost west limit on the transfer frame. The switch 238 remains with its contact making member 260 in engagement with its contact member 261 until the transfer truck passes its middle position when these contacts are opened. The switch 237 is the switch 109 in mechanical description and is adapted to open its contacts when the vehicle wheel engages it. When the front vehicle wheels engage the switch 237, its opening has no effect since the circuit for the relay R passes through the switch 238. However, when the transfer truck passes its center position, the switch 238 is opened and when the rear vehicle wheels rest in the depressions 108, the opening of the switch 237 opens the circuit of the motor 75 operating the transfer truck. It will be noted that since the circuit of the transfer truck motor 75 is not completed until the accelerator of the transfer frame motor operates the transfer frame motor overcomes the inertia of the vehicle and starts it moving. The transfer truck motor 75 is then cut in and the speed of movement of the vehicle is increased since the transfer truck motor is adapted to move the transfer truck considerably faster than the transfer frame is moved and the relay R is de-energized to bring about the de-energization of the transfer truck motor 75 before the transfer frame motor 51 stops. This slows down the movement of a car and absorbs some of its momentum. When the transfer frame 65 reaches its center position the switch 239 is operated so that its contact making member 253 swings into normal or open position opening the circuit of the relay N. The relay N is de-energized to open the circuit of the motor 51 and to complete a circuit for the brake 52. The vehicle has now been loaded on the carrier frame into its normal position. The operator may now place it in any desired vehicle stall, accessible to the elevator on any floor. The elevator operator predetermines what stall this is. For the purpose of description, it will be assumed that the elevator operator desires to place the car in one of the end stalls, accessible to the elevator on the same side as the loading station is located. The floor that the stall is located on, is immaterial so far as the operation is concerned. The elevator operator may set his car to the predetermined floor and will then operate the push button E—5. By the operation of the push button E—5, there is a circuit completed for the relay 204. The relay 204 is energized to complete a circuit for the relay H. The relay H is operated to complete a circuit for the carrier frame motor 64 which is energized to move the carrier frame in a transverse direction of the elevator platform 15. The operation of the relay H also serves to complete a locking circuit for itself and for relay 204 at the contacts H—2. The operation of the relay 204 also completes a circuit for the relay J. The relay J is energized to establish a locking circuit for itself at the contacts J—1 and to prepare a circuit for the timing relay L. The relay L is not operated at this time because a point in its circuit is opened at the contacts H—3 operated by the relay H. When the carrier frame has moved over to its proper position the limit switch 22 is operated and the circuit of the relay H is opened to bring about the de-energization of the motor 64 and the operation of the brake 67. The carrier frame is now in the proper position. When the relay H is de-energized, there is a circuit completed for the relay L, provided the contacts of the aligning switch 245 are closed, which occurs if the carrier is adequately aligned, and the elevator has reached the proper floor, is leveled thereat with the doors to the proper stall opened. This is all controlled by the switches 245 and 246 in the manner described. Relay L operates after a short interval of time to complete a circuit for the relay M through the contacts L—1 and J—3. The relay M is operated to complete a circuit for the transfer frame motor 51 in such direction as to project the transfer frame into the preselected storage stall. By the operation of the accelerator associated with motor 51, the switch 248 is closed and there is a circuit completed through the contacts M—1 for the relay Q. The relay Q is operated to energize the transfer truck motor 75 so as to drive the transfer truck 80 in the same direction as the transfer frame is moving. The rollers 95 which are extended, engage the wheels of the vehicle and move the vehicle along the trackway 21 of the carrier frame and into the trackway of the vehicle stall. It will be noted here that the transfer frame motor 51 first serves to start the car in motion and then after inertia of the vehicle is overcome, the transfer truck motor 75 is operated. By reasons of the differences in the motor speeds, the transfer truck reaches its extended position first and the limit switch 235 is operated to open the circuit of the relay Q. The relay Q is de-energized to open the circuit of the motor 75. When the transfer frame 65 reaches its extended position, the limit switch 231 is operated to open the circuit of the motor 51 and to bring about the operation of the brake 52. The vehicle is now positioned with its front wheels in track depressions 118 in the tracks in the storage stall. Now when the transfer frame and transfer truck are in the furthermost east extended position, there is a circuit completed from the positive terminal of the source of current, fuse 230, contacts of the switch 260', contacts of the switch 261', normally closed contacts U—3, relays S and T in multiple, contact member 251 of switch 241, contact making member 249 of said switch, emergency stop switch 228 and fuse 229 to the negative terminal of the source of current. The relay S is a timing relay and the two relays, S and T, when both are operated, complete a circuit for the roller arm motor 85 on the transfer truck. The reason that the timing relay S is employed is to give the vehicle time to center itself in the track depressions before the circuit of the motor 85 is completed. Motor 85 operates to move the roller arm spreaders 91 inwardly so as to remove the rollers 95 of the transfer truck from position on either side of the vehicle wheels. When these rollers reach their normal unextended position, the switch 241 is operated to swing the contact making member 249 in engagement with the contact member 250. The relay T operates to establish a locking circuit for itself through the contacts T—2 and opens the circuit of the relay L at contacts T—4. The relay L is de-energized to open the original energizing circuit of the relays T and S. Now upon the operation of the switch 241, the relays T and S are de-energized to open the circuit of the motor 85. In addition, the de-energization of the relay T brings about the completion of the circuit for the relay N through the switch 239. The relay N is energized to operate the motor 51 in such direction as to drive the transfer frame toward its normal position. When the transfer frame reaches its center position, the switch 239 is operated to open the circuit N and this relay retracts its armature to open the circuit of the motor 51 and to operate the brake 52. The elevator may now be returned to the loading floor in any usual well known manner.

It will be appreciated that automatic mechanism is preferably employed to bring about the elevator operation and to effect the opening and closing of doors to the proper stalls at the desired floors. The preferable practice is to provide in the three position elevator a door on each side of the hatch so that one door will serve three stalls. The circuits for controlling the elevator and door operation have not been shown, as an ordinary or usual type may be employed. However, the interlocks between the door and elevator operating equipment have been illustrated.

In order to bring about the operation of the switch controlled by the doors, it is the usual practice to provide cams that may be extended while the elevator is running. The relay 206' is adapted to perform this function and this relay is adapted to be energized through the switch 221 whose contacts are closed when the elevator is running.

The operation in obtaining a car from storage and delivering it occurs in the same manner as that hereinbefore described and it is thought will be obvious.

It will now be assumed that when a car is loaded on the carrier it is desired to store it in a storage stall on the opposite side of the elevator from that which it was received. In order to accomplish this result the elevator operator will press the push button W—2, assuming that this corresponds to the desired stall. The depression of the push button W—2 occurs, of course, after the elevator operator has initiated the movement of the elevator to the proper floor. When the push button W—2 is depressed, there is a circuit completed for the relay 201, and this relay attracts its armature 209, whereby a circuit is completed for the relay I. The relay I is operated to complete a circuit for the carrier frame motor 64 so as to move the carrier frame 19 in a transverse direction toward its pre-determined position. The operation of the relay I also establishes a locking circuit for itself and for the relay 201 at the contacts I—2, exclusive of the push button W—2.

Another result of the operation of the push button W—2 is that there is a circuit completed through the normally closed contacts P—3, relay P, switch 234, limit switch 235, emergency stop switch 228 and fuse 229 to the other terminal of the source of current. Relay P is energized over this circuit and operates to open its original energizing circuit at the contacts P—3 and establish a locking circuit for itself at the contacts P—4. The operation of the relay 201 also completes a circuit through the normally closed contacts K—2, the relay K and the contacts T—4 and U—4. The relay K operates to complete a locking circuit for itself at contacts K—1. The motor 64 of the carrier frame continues to operate until the carrier frame is moved to the proper position, whereupon the limit switch 227 is operated to open the circuit of the relay I, which is de-energized. When the relay P operates, there is a circuit completed through the contacts P—5, contacts K—5, normally closed contacts U—3 and the relays S and T in multiple, contact member 251 of the switch 241, contact making member 249 to the other side of the line. Relays S and T are energized over this circuit and complete a circuit for the roller arm motor 85, so as to draw the rollers away from the vehicle wheels. The operation of the relay T also opens the circuit of the relay K at the contacts T—4 and this relay is de-energized. The relay T, as well as the relay S, is de-energized when the roller arms are moved back to their normal position by the operation of the switch 241. The operation of the motor 85 then ceases. When the relay K is de-energized, there is a circuit completed through the contacts K—4 for the relay O. The relay O is energized to establish a locking circuit for itself. When the switch 241 is operated, there is a circuit completed by way of the switch through the relay V and the contacts P—6. The relay V establishes a locking circuit for itself at its contacts V—3, and prepares a circuit for the relay U at contacts V—4. Another result of the operation of the relay V is that at the contacts V—2, there is a circuit completed for the relay Q. The relay Q is operated to complete a circuit for the motor 75 so as to drive the transfer truck 80 toward the end of the transfer frame 65, when the transfer truck is properly positioned at the end of the transfer frame, limit switch 235 is operated to open the circuit of the relay Q. The transfer truck is now in position directly adjacent to the vehicle wheels. This is true because the transfer truck in its forward movement was stopped when the rear wheels of the vehicle were resting in the track depressions, so it is only necessary to drive the transfer truck back to its limit of travel. The operation of the limit switch 235 opens the circuit of the relay Q and also the circuit of the relay P. These relays are de-energized. The de-energization of the relay P serves to complete a circuit for the relay U through the contacts P—7. The relay U is operated to energize the motor 85 and drive the rollers to their proper position on either side of the rear wheels of the vehicle, whereupon the circuit of the relay U is opened as is the circuit of the relay V at the switch 241. The relay V is de-energized. Now when the elevator reaches the desired floor, the switches 245 and 246 are operated to complete a circuit for the relay L and the relay L is energized to complete a circuit through the contacts L—1 and K—3 for the relay N, the relay K having been previously operated by the energization of the relays O and V through the contacts O—1 and V—1. The relay N is operated to complete a circuit for the motor 51 whereby the transfer frame 65 is shifted in front of the proper stall. By the operation of the accelerator, the relay R is energized to operate the motor 75 of the transfer truck so that the vehicle is moved along the tracks 21 on the carrier frame into the storage rack. The remaining operations of the equipment occur in identically the same manner as before described. The transfer frame eventually returning after the vehicle has been stored to its position on the elevator.

From the foregoing, it is thought that the manner in which a vehicle may be taken and stored in any stall or removed from storage in any stall, accessible to the particular elevator on any floor, will be obvious.

Certain special conditions which may arise will now be considered.

It is possible that the elevator operator may choose a stall in which a car is already placed and may desire to stop the cycle of operation and set up a new cycle under these conditions. In this case, it is only necessary to operate the emergency stop switch 228. It will be seen that the operation of this switch opens up the battery circuit to the control equipment. This will immediately stop and release any cycle of operation that has been set up and a new set of operations can be initiated by the operator in identically the same manner as has been described.

There is also the possibility that the elevator operator, after depressing one push button, may accidentally depress another push button. In order to prevent this accidental depression of a second button interfering with the operation that has already been set up, the resistor 225 is inserted in series with the relays 200 to 205, inclusive. After the relay 205 for example, is operated, the depression of another push button will not cause any operation, for the reason that as soon as another push button is depressed, another circuit for a relay such as 204 is closed, but the energy that may be obtained through the resistor 205 is limited so that the relay 204 cannot be operated. This condition does not cut down the current flow in the relay 205 that has been operated sufficiently to bring about the retraction of its armature. This is true because a weaker magnetic field is capable of maintaining the armature of the relay attracted, because a closed magnetic circuit is present.

Another possibility that may arise is that the carrier frame does not align itself in the proper position. This may arise from a defective brake or defective cam setting. It is then necessary for the operator to align the carrier tracks with those in the storage stall. To accomplish this result two push buttons N' and S' are provided. It will be seen that the operation of the push button N' completes a circuit for relay H direct, while the operation of the push button S' completes the circuit for the relay I direct. The relays H and I control the operation of the motor 64 which moves the carrier frame transversely. By the operation of these push buttons, the carrier tracks can thus be aligned with the stall tracks. In fact, by the operation of these push buttons, the carrier can be positioned opposite another stall if desired and the cycle of operations can proceed in the manner before described.

The vehicle handling mechanism of the present invention has been carefully designed with a view of using various standard units and parts in combination to accomplish the desired results. Substantially no new mechanical units have been employed in the combination, though the manner of handling the vehicle and the results accomplished are entirely new. This enables the mechanism to be constructed without any special manufacturing cost. In addition, if anything wears out or gets out of order, it is very easy to obtain spare parts therefor.

Attention is directed to the fact that the vehicle handling mechanism operates in such manner as to store the vehicle or remove it from storage with great speed. One of the reasons for this is that the mechanism on the elevator which handles the car performs those functions incidental to properly positioning the vehicle, by the carrier frame aligning itself with the proper stall, and the shifting of the transfer truck between the wheels if necessary, during the time that the elevator is moving toward a floor. This means that when the floor is reached, it is only necessary for the vehicle handling mechanism to place the car in the stall and return or to obtain the car therefrom. This greatly reduces the time that it takes to handle a car.

It is to be noted also that the vehicle handling mechanism is mounted on the elevator and is common to a large number of stalls. There is no necessity of employing any individual apparatus in the stalls. Another great advantage obtained by the use of my invention, is that all the electrical wiring is inside the elevator hatches. There is no wiring from any storage stall to the elevator. This greatly reduces the cost of installation.

The automobile handling mechanism operates in the manner described, irrespective of variation in the wheel base of the vehicles.

It has been stated hereinbefore, that the car handling mechanism is particularly adapted for high speed operation when it is common to approximately one hundred storage stalls. It will be appreciated that where this high speed of operation is not necessary, a greater number of stalls may be served by this common handling mechanism. By reason of this restriction to approximately one hundred stalls where high speed operation is necessary, it may be necessary in higher buildings to limit the size of the elevator, depending upon the height of the garage; thus, in a 25 story building, it would be advisable to employ a two position elevator. In this event, the operation and mechanism is identically the same as that described, with the exception that the electrical control circuits necessary for the three position type may be cut down to the two. In the event that it is desired to use a still higher building, for example, 50 stories, a one position elevator would be employed for high speed operation. This would simplify the mechanism to a great extent as the carrier frame transverse movement could be entirely eliminated, it being only necessary to secure a movement of the transfer frame, and the transfer truck in the one position elevator. It is thought that these changes and adaptions to meet various conditions will be obvious from the foregoing description.

My invention is not limited to the particular arrangement of apparatus described but may be variously changed and modified without departing from the spirit and scope thereof as indicated in the appended claims.

I claim:

1. In a vehicle storage structure, an elevator hatchway, a plurality of floors having a number of storage spaces on opposite sides of the elevator hatchway on each floor, car handling mechanism mounted upon said elevator, means for moving said elevator to a predetermined floor, and means operative during the elevator movement for moving said car handling mechanism in vertical alignment with a predetermined row of stalls.

2. In a vehicle storage structure, an elevator hatchway, a plurality of floors having a number of storage spaces on opposite sides of the elevator hatchway on each floor, car handling mechanism mounted upon said elevator, means for moving said elevator to a predetermined floor, means operative during the elevator movement for moving said car handling mechanism in vertical alignment with a predetermined row of stalls, and means operative when the elevator reaches the predetermined floor for projecting said car handling mechanism into one of the storage stalls with which it is aligned.

3. In an apparatus for handling automobiles and like vehicles, an elevator platform, a carrier frame mounted on said platform for movement thereon, and a transfer frame mounted on said platform for movement thereon, and a transfer truck mounted upon said carrier frame and movable with respect to it.

4. In an apparatus for handling automobiles and like vehicles, an elevator platform, a carrier frame mounted on said platform and movable thereupon, vehicle wheel supporting tracks carried by said carrier frame and a vehicle engaging device carried by said carrier frame and movable with respect to it to move a vehicle along said tracks.

5. In an apparatus for handling automobiles and like vehicles, a carrier frame adapted for movement in two directions, a transfer frame mounted on said carrier frame and movable with respect to it in two directions and a transfer truck mounted on said transfer frame and movable with respect to it.

6. In an apparatus for handling automobiles and like vehicles, a carrier frame adapted for movement in two directions, a transfer frame mounted on said carrier frame and movable with respect to it in two directions and a transfer truck mounted on said transfer frame and movable with respect to it in two directions paralleling the directions of movement of said transfer frame.

7. In an apparatus for handling automobiles and like vehicles, a carrier frame adapted for movement in two directions, a transfer frame mounted on said carrier frame and movable with respect to it in two directions, a transfer truck mounted on said transfer frame and movable with respect to it, and vehicle wheel engaging members carried by said transfer truck.

8. In an apparatus for handling automobiles and like vehicles, a carrier frame adapted for movement in two directions, a transfer frame mounted on said carrier frame and movable with respect to it in two directions, a transfer truck mounted on said transfer frame and movable with respect to it, and vehicle wheel engaging members carried by said transfer truck, and movable with respect to it.

9. In an apparatus for handling automobiles and like vehicles, an elevator platform, a carrier frame mounted on said platform and movable with respect to it, automobile wheel tracks carried by said carrier frame and wheel extension tracks mounted at the end of said vehicle wheel tracks and adapted to bridge the gap between the elevator platform and any storage floor.

10. In an apparatus for handling automobiles and like vehicles, an elevator platform, a carrier frame mounted on said elevator platform and movable with respect to it, vehicle wheel engaging members mounted on said carrier frame and movable with respect to it, adapted to move a vehicle on said carrier frame by engaging a pair of wheels of said vehicle and means operative after said vehicle is moved onto said carrier frame for transferring said vehicle wheel engaging members into engagement with another set of wheels of said vehicle.

11. In an apparatus for handling automobiles and like vehicles, a truck like structure, means for moving said structure into proximity of a vehicle, vehicle wheel engaging members mounted on said structure and movable with respect to it to engage the front wheels of the vehicle on either side thereof.

12. In an apparatus for handling automobiles and like vehicles, a truck like structure, means for moving said structure into proximity of a vehicle, vehicle wheel engaging members mounted on said structure and movable with respect to it to engage a pair of wheels of the vehicle on either side thereof and means for moving said truck to roll said vehicle on its own wheels.

13. In an apparatus for handling automobiles and like vehicles, a truck like structure, vehicle wheel engaging members mounted on said structure and movable with respect to it and rollers carried by said vehicle wheel engaging members.

14. In a vehicle storage system, the combination with a vehicle storage structure having a plurality of floors, an elevator hatch extending from top to bottom of the structure, an elevator cab adapted to move in said hatch having supporting means and a vehicle carrier mounted on said supporting means movable in a direction at substantially right angles to its length, of mechanism operative to move said carrier transversely of said elevator from one side to the other thereof on said supporting means.

15. In a vehicle storage system, the combination of a vehicle storage structure having a plurality of floors, an elevator hatch extending from top to bottom of said structure, an elevator platform adapted to travel in said hatch and a vehicle carrier carried by said elevator platform and movable with respect to it, said platform being sufficiently wide to accommodate a plurality of carriers placed side by side and mechanism for moving said carrier from one side of the elevator to the other transversely.

16. In a vehicle storage system, the combination with a vehicle storage structure having a plurality of floors, an elevator hatch extending from top to bottom of said structure, an elevator platform adapted to travel in said hatch and a vehicle carrier carried by said elevator platform and movable with respect to it, said platform being sufficiently wide to accommodate a plurality of carriers, placed side by side, of mechanism for moving said carrier from one side of the elevator to the other transversely and comprising a rack member and a pinion member, one of said members being associated with the carrier and the other said members being associated with the platform and a motor for driving said pinion member.

17. In a vehicle storage system, the combination with a vehicle storage structure having a plurality of floors, an elevator hatchway extending from top to bottom of said structure, an elevator platform adapted to travel in said hatchway and a vehicle carrier carried by said elevator platform and movable with respect to it, said platform being sufficiently wide to accommodate a plurality of carriers placed side by side of power mechanism for moving said carrier transversely from one side of the elevator platform to the other in such manner as to permit movement of the platform in the hatchway during such transverse movement of said carrier.

In witness whereof I hereunto subscribe my name this 21st day of April, 1928.

SAMUEL E. BUETTELL.